United States Patent
Wilhelm Martens et al.

(10) Patent No.: US 9,170,714 B2
(45) Date of Patent: Oct. 27, 2015

(54) MIXED TYPE TEXT EXTRACTION AND DISTRIBUTION

(71) Applicant: Motorola Mobility LLC, Libertyville, IL (US)

(72) Inventors: Johannes Peter Wilhelm Martens, San Francisco, CA (US); Michael D McLaughlin, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 382 days.

(21) Appl. No.: 13/731,134

(22) Filed: Dec. 31, 2012

(65) Prior Publication Data

US 2014/0123045 A1      May 1, 2014

Related U.S. Application Data

(60) Provisional application No. 61/720,664, filed on Oct. 31, 2012.

(51) Int. Cl.
| | |
|---|---|
| *G06F 3/048* | (2013.01) |
| *G06F 3/0484* | (2013.01) |
| *G06F 9/54* | (2006.01) |

(52) U.S. Cl.
CPC .............. *G06F 3/0484* (2013.01); *G06F 9/543* (2013.01)

(58) Field of Classification Search
None
See application file for complete search history.

(56) References Cited

U.S. PATENT DOCUMENTS

| | | | |
|---|---|---|---|
| 7,904,596 B1* | 3/2011 | Wang et al. | 709/246 |
| 2003/0185448 A1* | 10/2003 | Seeger et al. | 382/229 |
| 2003/0202683 A1* | 10/2003 | Ma et al. | 382/104 |
| 2006/0288279 A1* | 12/2006 | Yacoub et al. | 715/530 |
| 2007/0015118 A1 | 1/2007 | Nickell et al. | |
| 2008/0086700 A1 | 4/2008 | Rodriguez et al. | |
| 2008/0219493 A1 | 9/2008 | Tadmor | |
| 2008/0282153 A1 | 11/2008 | Kindeberg et al. | |
| 2010/0174980 A1* | 7/2010 | Mansfield et al. | 715/234 |

(Continued)

FOREIGN PATENT DOCUMENTS

| | | |
|---|---|---|
| EP | 0762298 A2 | 12/1997 |
| WO | 0188854 A2 | 11/2001 |
| WO | 2012075315 A1 | 6/2012 |

OTHER PUBLICATIONS

Capturetext, http://www.capturetext.com/, Sep. 6, 2012, all pages.
Ritu Saxena, Capture Real User Interaction While Beta Testing of iOS Apps Wth Delight.io, http://www.toolsjournal.com/index. php?option=com_k2&view=item&id=790:capture-real-user-interaction-while-beta-testing-of-ios-apps-with-delightio&Itemid=220&tmpl=component&print=1, Aug. 14, 2012, all pages.

(Continued)

*Primary Examiner* — Ryan Pitaro
*Assistant Examiner* — Hua Lu
(74) *Attorney, Agent, or Firm* — Shumaker & Sieffert, P.A.

(57) ABSTRACT

Systems, methods, and devices for extracting and distributing text of mixed types from displayed graphical data from a display of an electronic device are disclosed. The text types can include rendered text and text represented in rendered images. Displayed graphical data can be captured from data being displayed by an application on a display device. Text data can be extracted from the captured graphical data as text data at the rendering tree level, or by an optical character recognition process. In response to the extracted text data, a text selection tool with visual representations of selectable text can be applied to the displayed text data. Using the text selection tool, a user can select a subset of the text. In response to the user selection, one or more other applications can be determined and the selected text can be passed to at least one of the other applications for execution.

6 Claims, 11 Drawing Sheets

(56) References Cited

U.S. PATENT DOCUMENTS

| | | | |
|---|---|---|---|
| 2012/0131520 A1* | 5/2012 | Tang et al. | 715/863 |
| 2012/0163668 A1* | 6/2012 | Englund et al. | 382/103 |
| 2012/0216102 A1* | 8/2012 | Malla | 715/206 |
| 2012/0216114 A1* | 8/2012 | Privault et al. | 715/702 |
| 2012/0330646 A1* | 12/2012 | Andrade et al. | 704/7 |
| 2013/0021346 A1* | 1/2013 | Terman | 345/467 |
| 2013/0262594 A1* | 10/2013 | Bastide et al. | 709/206 |
| 2014/0082646 A1* | 3/2014 | Sandland | 725/14 |

OTHER PUBLICATIONS

Data Extraction Software, http://www.scrappingexpert.com/data_extraction_software.html, Sep. 6, 2012, all pages.

Patent Cooperation Treaty, "PCT Search Report and Written Opinion of the International Searching Authority" for International Application No. PCT/US2013/063371 dated Apr. 4, 2014, 11 pages.

International Preliminary Report on Patentability from International Application No. PCT/US2013/063371, mailed May 14, 2015, 9 pp.

* cited by examiner

MIXED TYPE TEXT EXTRACTION AND DISTRIBUTION

BACKGROUND

Electronic devices typically run an operating system for controlling the base level functionality of the electronic device. To add additional or specialized functionality to the electronic device, the operating system can execute one or more registered or unregistered applications. Registered applications typically comply with some predetermined application programming interface (API) to ensure efficient and easy interoperability with the operating system. Data, such as text data, can be sent back and forth between the registered applications and the operating system; however, the electronic device has no mechanism for sharing text data between the operating system and other unregistered applications. Unregistered applications often include integrated graphics engines and output data to the display without using the electronic device's graphics engine. In some instances of unregistered applications, text is rendered as an image and underlying text data for rendering text is lost for sharing with the operating system and other applications.

To enable sharing of text data between various applications, some conventional systems have implemented basic variations of "copy-and-paste" functionality. In such solutions, a user selects text or images displayed on the graphical user interface of the electronic device, initiates a copy or cut command, opens another application, selects a field, and initiates a paste command. Whatever text or image that was copied will be inserted in the field selected by the user. However, only information displayed by an active instance of the operating system or standalone application as rendered text can be selected and copied into active memory as text data. Any text that is rendered as an image with no underlying renderable text data is unavailable for copying and pasting between applications. In such scenarios, a user may need to enter the text manually into another application.

Accordingly, traditional cut-and-paste operations have various drawbacks and deficiencies with respect to sharing mixed type text data, i.e., rendered text and rendered images with embedded text, among multiple applications and the operating system. One specific issue with cut-and-paste operations involves the limited nature with which the text can be pasted into multiple applications simultaneously. To enter the copied text into multiple applications at the same time, a user would need to launch each application and perform the pasting function into each of the desired text fields individually. Such manual processes are laborious and time-consuming. Additionally, traditional cut-and-paste operations are limited to the selection of rendered text and cannot select text presented on a graphical user interface that is rendered as an image, i.e., a picture depicting words.

DETAILED DESCRIPTION

Figure 1:
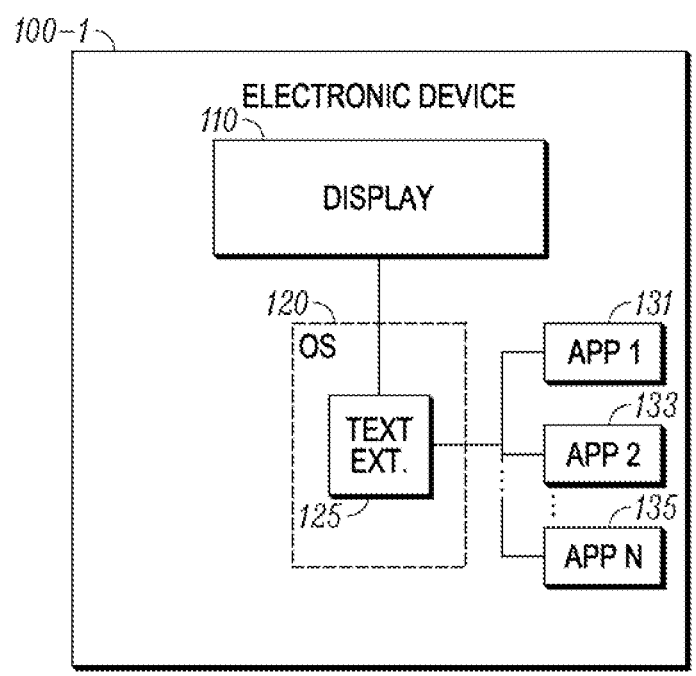
FIG. 1 is a simplified schematic of an electronic device with text extraction.

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Described herein are techniques for capture and integration of text data associated with the dynamic state of applications on various types of electronic devices. One example method includes capturing graphical data from application data being output by a first application that is actively displaying a portion of the application data on a display device associated with the electronic device. Such methods further include extracting text data from the graphical data using a text extraction process, and in response thereto, displaying a text selection tool on the display device. The method can also include receiving a user input designating a subset of the text data through the text selection tool and executing another application. The subset of the text data can be available for use by the other application in response to receiving the user input designating the subset of the text data.

Related embodiments provide for the determination of text information from graphics output to a display device, as well as determination of text intercepted from a rendering level from applications that use a general purpose graphics engine in the electronic device. Such text information can then be shared among the operating system and various other applications and services.

Various other embodiments of the present disclosure include methods that include extracting the text data by segmenting the application data into multiple zones, associating each of the zones with a zone type designators, and determining the text data from the plurality of zones based on the zone type designators. In such embodiments, zone type designators can include a text field designator and an image field designator. Determining text data from the zones can include executing a text interception routine as the text extraction process on a zone associated with the text field designator at a rendering level of the electronic device.

Other embodiments of the present disclosure include a non-transitory computer-readable storage medium containing instructions, that when executed, control an electronic device to be configured to capture graphical data from application data being output by a first application that is actively displaying at least a portion of the application data on a display associated with the electronic device, and to extract text data from the graphical data using a text extraction process. Such embodiments can also include instructions to display a text selection tool in response to extracting the text data, and receive a user input designating at least a subset of the text data through the text selection tool. Such instructions can also include instructions to execute one or more second applications, where the subset of the text data can be available for use by the applications in response to receiving the user input designating the subset of the text data.

Yet other embodiments include an apparatus having one or more computer processors, a display device coupled to the one or more computer processors, and a non-transitory computer-readable storage medium comprising instructions, that when executed, control the one or more computer processors to be configured to capture graphical data from application data being output by an application that is actively displaying a portion of the application data on the display device and extract text data from the graphical data using a text extraction process. When the text data is extracted, the instructions also include instructions to display a text selection tool in response to extracting the text data, receive a user input designating a subset of the text data through the text selection tool, and execute other applications, wherein the subset of the text data is available for use by other applications in response to the user input designating the subset of the text data.

FIG. 1 illustrates an example of an electronic device 100 the can be used to implement various embodiments of the present disclosure. Electronic device 100 can include various types of electronic devices, such as mobile devices including smartphones, tablet computers, handheld computers, and laptop computers. One of ordinary skill in the art will recognize that various embodiments of the present disclosure can be implemented in a wide variety of electronic devices, such as desktop computers.

As shown in FIG. 1, electronic device 100 can include a display device (Display) 110 coupled to an operating system (OS) 120 executed on a computer processor. In various embodiments operating system 120 can include a text extractor (Text Ext.) 125. In the specific embodiment shown in FIG. 1, the display device 110 and multiple standalone or integrated applications 131, 133, and 135 can be coupled to the text extractor 125. Such standalone or integrated applications 131, 133, and 135 can be provided by the manufacturer of the electronic device 100, or can be installed or downloaded according to user preferences to customize the functionality of the electronic device 100.

As many as N, where N is a natural number, applications can be running simultaneously, limited only by the amount of processing power and memory of electronic device 100. At any given time, one of the N applications can be running in the foreground. In some embodiments, when an application is running in the foreground, it is referred to as the active application and can cause a particular graphical user interface associated with the active application to be displayed on display device 110 along with any standard or persistent graphical user interface components, i.e. date, time, or battery level, provided by the operating system 120.

As shown, text extractor 125 can be an integrated subroutine or sub process of the operating system 120. In such embodiments, the text extractor 125 can access data before and/or after it is sent between internal components of the operating system 120 and any of the applications 131, 133, and 135. Accordingly, the text extractor 125 can intercept text and graphical data before and after being sent to a graphics engine (not shown) of the operating system 120. For example, text extractor 125 extracts text from graphical data being displayed in an active application. The text extractor 125 then allows the text to be available for use in another one of the applications. Similarly, the text extractor 125 can send and receive text data from each of the N applications, as well as send and receive graphical data from each of the N applications. Although the text extractor 125 is described as being part of operating system 120, the text extractor 125 may operate separately from operating system 120, such as in an application running on the operating system 120.

Figure 2:
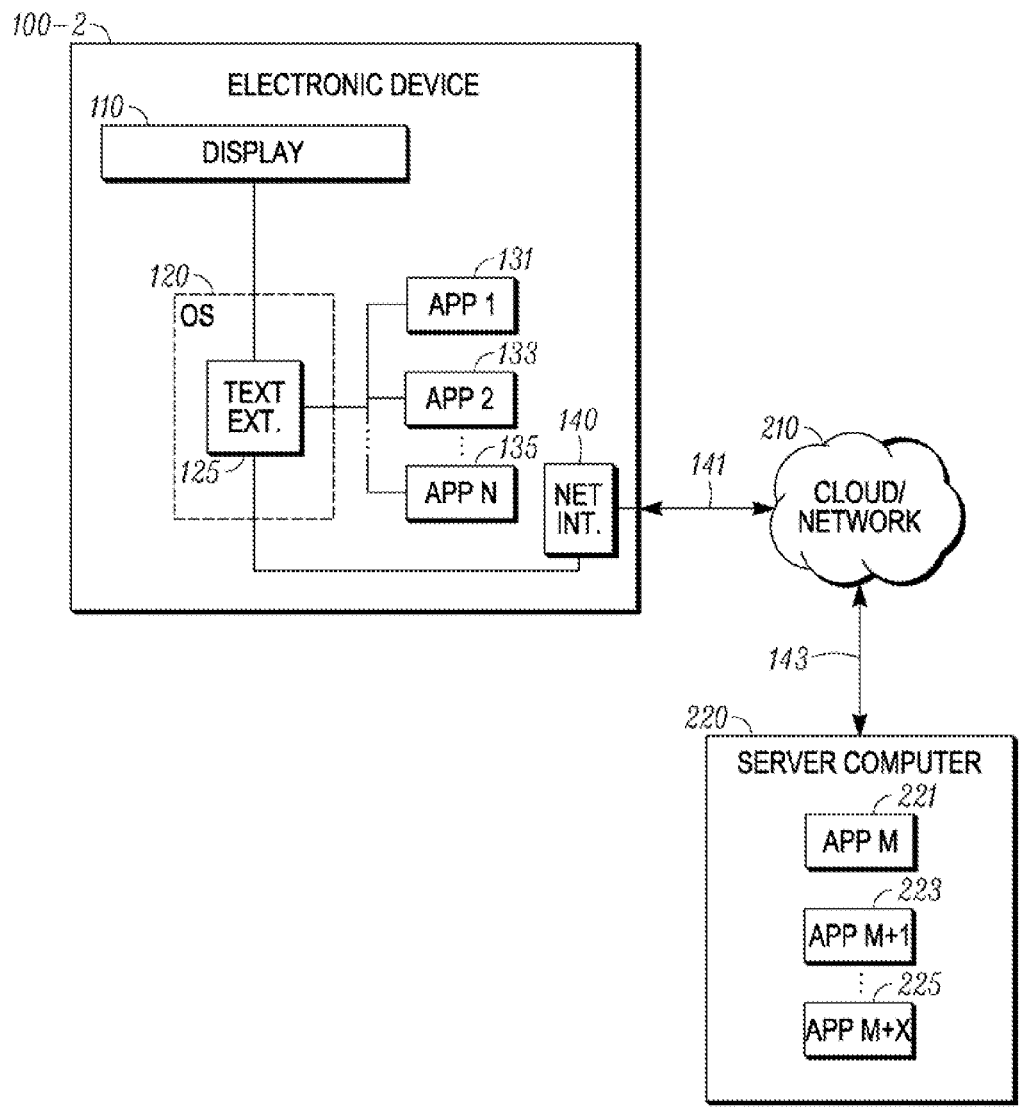
FIG. 2 is a simplified schematic of network enabled electronic device with text extraction.

FIG. 2 illustrates a network enabled electronic device 100 according to various embodiments of the present disclosure. Electronic device 100 includes similar components and connections between the various constituent components, as described above in reference to electronic device 100 in FIG. 1. Accordingly, electronic device 100 can include a display device 110 coupled to an operating system 120 and/or an integrated text extractor 125. Electronic device electronic device 100 can also include N applications 131, 133, and 135, with connections to the operating system 120 and/or the text extractor 125. The network enabled electronic device 100, in addition to the aforementioned components can also include a network interface 140 coupled to the operating system 120 and/or the text extractor 125.

Network interface 140 can implement various wired and wireless communication protocols and capabilities. For example, network interface 140 can include Wi-Fi, Ethernet, Worldwide Interoperability for Microwave Access (WiMAX), 3G, 4G, 4G Long-Term Evolution (LTE), Edge, and other wired and wireless functionality for communicating with a remote server computer 220 through cloud/network 210 over connections 141 and 143.

In such network enabled embodiments, the operating system 120 and/or text extractor 125 can communicate various types of data with remote server computer 220. For example, operating system 120 can communicate with server computer 220 via a network interface 140 to download and/or remotely execute any of M, where M is a natural number, applications 221, 223, or 225, resident on server computer 220.

Some variations of data flows for capturing text, indicating selectable text, selecting text, and sharing the selected text amongst various components of the electronic device 100 will now be discussed. First, an example that includes extracting text from the operating system level rendering tree will be discussed, then variations of similar systems will be discussed that require internal and standalone optical character recognition (OCR) processes, routines, or applications, will be discussed.

Figure 3:
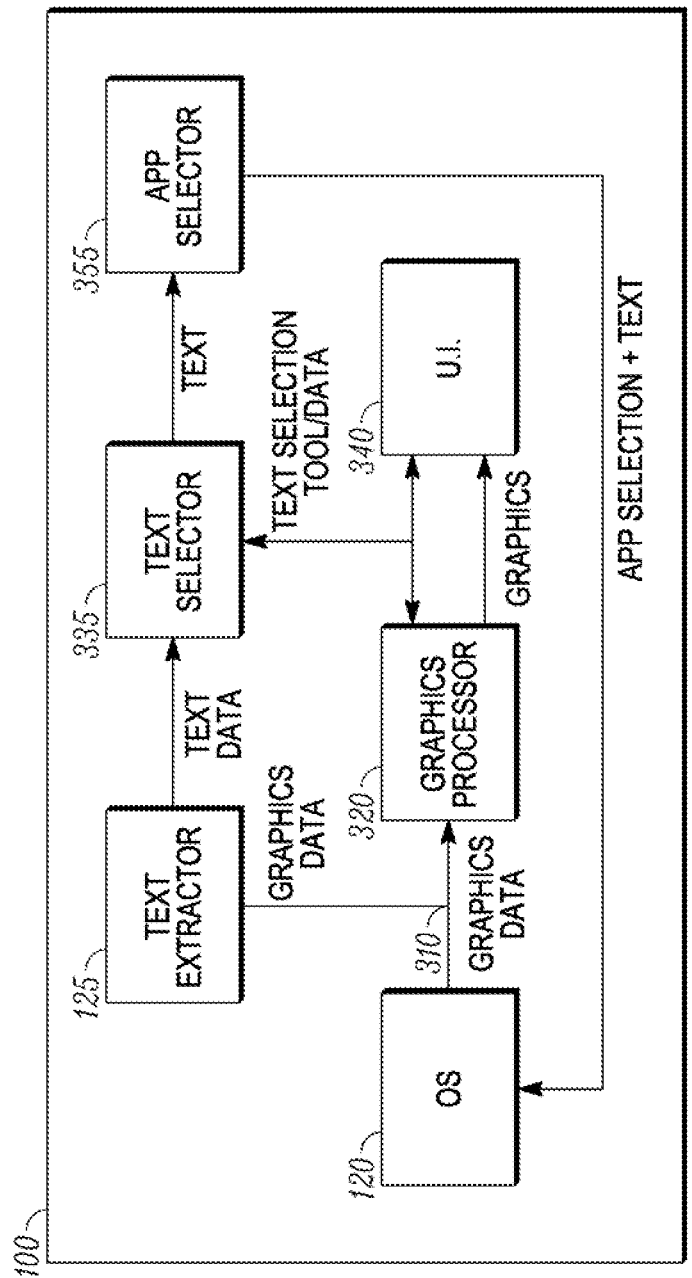
FIG. 3 illustrates the data flow in a system with graphics rendering level text extraction.

FIG. 3 illustrates the data flow among operating system 120, and various standalone and integrated applications, functions, and components, such as displays and user interfaces, of the electronic device 100. Specifically, the example configuration of FIG. 3 illustrates an embodiment in which the text extractor 125, can intercept graphical data before such data is sent to a graphics processor 320.

The operating system 120 can originate commands for sending graphical data to a user interface 340. Such commands can include sending graphical data to the graphics processor 320. Text extractor 125 can intercept the graphical data at point 310. The graphical data generated by operating system 120 can include data for rendering text and/or images, such as pictures, photographs, animation, etc.

The text extractor 125 can determine the portions of the graphical data that include text data for rendering of text. As used herein, text data refers to any proprietary or open source encoding of letters, words, characters, or symbols used by a computer, computer processor, or graphics engine for generating rendered and/or selectable text on a computer output device, such as computer display. For example, text data can include ASCII, hexadecimal, binary, and other systems or schemes for encoding text. Rendered text refers to any visual representation displayed on a computer display or other output device that represents the actual letters, words, characters, or symbols without reference to the variations of the visual representation, such as size, font, or other formatting variations.

From the graphical data, text extractor 125 can determine the text data and send it to text selector 335. In such embodiments, the text data can include text rendering information such as size and location such that the text selector 335 can accurately locate and determine where the text will be rendered in the display or user interface. In response to the text data, text selector 335 can send text selection tool data to the user interface 340 to augment user interface generated by the operating system 120 by a graphics processor 320. In some embodiments, the text selection tool data can include instructions for changing the appearance of the rendered text displayed in user interface 340 to provide a visual indication of which text is selectable. Changing the appearance of the rendered text displayed in the user interface 340 can be performed by either the graphics processor 320 or directly by text selector 335.

Changing the appearance of the rendered text displayed in the user interface 340 can include changing the size, shape, format, highlights, color, or other characteristic of text displayed or rendered in the user interface 340. For example, text that would normally be rendered as black on a white background, can be rendered as black on a transparent yellow background to indicate that that text is selectable. The text selection tool data can also include instructions for changing the appearance of selected text, or providing some other visual indication of selected text, in response to user input. In reference to the example in which selectable text is rendered as black text on a transparent yellow background, when some portion of such text is selected by a user, the appearance of the text can change such that it is displayed as red text on a transparent yellow background. While this specific example of visual indications of selectable and selected text can be effective, one of ordinary skill in the art will recognize that various other types of visual indications of selectable and selected text can be used without deviating from the spirit or scope of the present disclosure.

Text selector 330 can receive user input indicating user selected text through the user interface and/or the text selection tool. The text selector 330 can then send the text, or text data representing the text, to the application selector 355. Application selector 355 can, in response to receiving the text, the text data representing the text, and/or a context meaning or definition associated with the text, select one or more applications into which the text can be pasted or otherwise entered into. Application selector 355 can send the selection of applications and the text or the text data to the operating system 120 with instructions for invoking or initiating the selection of applications and entering of the selected text. Operating system 120 can then invoke or initiate the selection of applications and insert the selected text into the appropriate text fields or inputs.

Figure 4:
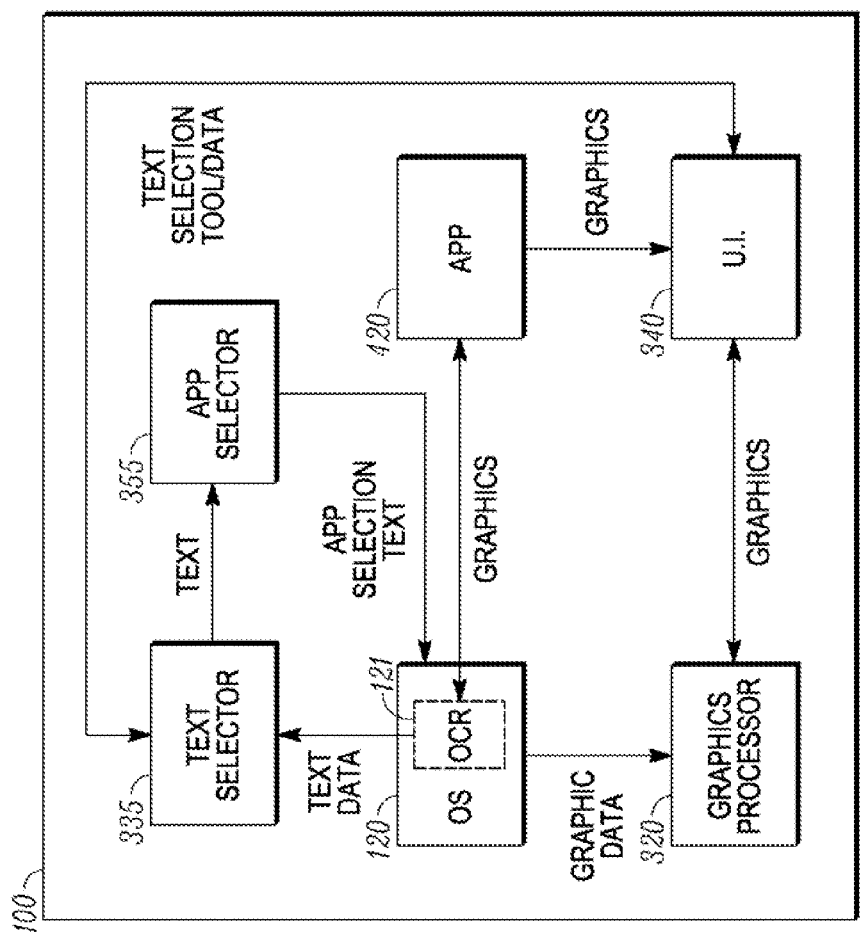
FIG. 4 illustrates the data flow in a system with OCR integrated into the operating system of an electronic device for text extraction.

FIG. 4 illustrates the data flow among operating system 120, various integrated functionality of the operating system 120, various standalone applications, and components of the electronic device 100, according to yet another embodiment of the present disclosure. The example shown in FIG. 4 include scenarios in which applications, such as application 420, do not comply with or utilize an application programming interface (API) for integrated operation with operating system 120. In such embodiments, the application 420 can send rendered graphics directly to the operating system 120 and/or optical character recognizer 121. Such embodiments differ from those described above in reference to FIG. 3 in that application 420 does not utilize the graphics processor 320. Rather, application 420 sends rendered graphics to graphics processor 323. Graphic processor 323 then renders the graphical data from the operating system and combines the rendered graphics from application 420 with the rendered graphics from operating system 120. Graphics processor can then display the combined rendered graphics on user interface 340. Examples of application types that can include application specific graphic engines independent of the graphics engines of the operating system or electronic device include, but are not limited to, photography, video, and drawing tool type applications. Such applications can output graphics that include images of text, but may not necessary include data for rendering the text.

As shown, optical character recognizer 121 can be integrated with operating system 120. In such embodiments, the optical character recognizer 121 can directly or indirectly receive the separately rendered graphics from application 420. Optical character recognizer 121 can then perform various types of OCR routines or processes on the graphics from application 420 to recognize text data from the rendered graphics. In some embodiments, performing the OCR routine can be in response to user input received through a control included in a window rendered on user interface 340. In such embodiments, the control can include a button, or other operable element, rendered in a window on user interface 340. In other embodiments, the control can included a keystroke or series/combination of keystrokes on a user input device, such as keyboard, coupled to the electronic device.

In some embodiments, the OCR routine can include a screen capture or screen-shot operations. In other embodiments, a separate application may perform such screen capture or screen-shot operations, and the separate application can send the resulting graphic or image to the optical character recognizer 121.

In all such embodiments, the OCR operations can include recognizing images or graphics that are and/or are not actively being displayed in user interface 340. For example, an image rendered by application 420 can be larger than the available display space on a user interface 340. The OCR operation may recognize portions of the image that off of or not displayed on the display space. In related embodiments, operating system 120 and/or application 420 can include zoom functions that results in only portions of the rendered image being displayed on user interface 340 at a given time. In such scenarios, a user can use various types of controls to scroll or scan around the image such that different portions of the image are viewable on user interface 340 at a time. In such scenarios, initiation of a screen capture operation can be configured to capture only the portion of the image viewable on user interface 340, or configured to capture the entirety of the image based on the graphical data used to render the image.

In some embodiments, it is advantageous that the screen capture operation be configured to only capture the portion of the image viewable on user interface 340 so that only that portion of the image is sent to the optical character recognizer 121. As a result, the text data from optical character recognizer 121 can include both size and location of the text in the image or graphics from application 420 or a screen capture operation as it is or will be displayed on user interface 340. The text selector 335 can the accurately position visual indications of selectable and/or selected text in the user interface 340 based on the portion or zoom level of the image displayed on user interface 340.

Using the text data from the optical character recognizer 121, text selector 335 can provide various types of selection tools. In some embodiments, the text selection tools can include visual indications of selectable text in the user interface 340. Through the text selection tools, the text selector 335 can receive an input that selects text from a user. The selected text can then be sent to application selector 355, which selects one or more applications in which the selected text is available to these applications. Application selector 355 may select the applications according to various contexts, definitions, and meanings associated with the selected text, or various types of applications that might be useful to the user based on processes and routines beyond the scope of the present disclosure. In some embodiments, application selector 355 sends the application selection and text to the operating system 121 along with value pairs that can include an application identifier and the text. Operating system 120 can then invoke or initiate the applications associated with the various application identifiers and enter or insert the text where appropriate.

Figure 5:
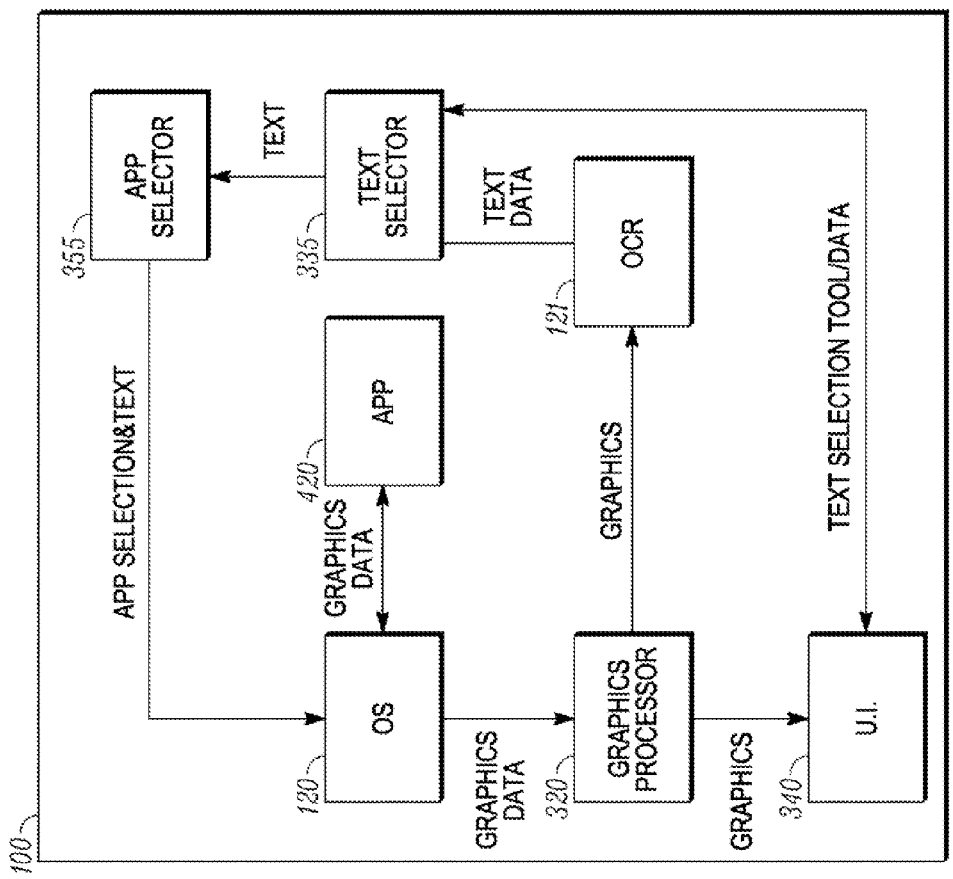
FIG. 5 illustrates the data flow in a illustrates the data flow in a system with application based OCR for text extraction.

FIG. 5 illustrates a data flow in embodiments that include an optical character recognizer 121 that is separate from operating system 120, in electronic device 100. In some embodiments, optical character recognizer 121 can include an application that is run in the background at all times. In other embodiments, optical character recognizer 121 can include an application that is only run when initiated in response to user input. In such embodiments, optical character recognizer 121 and/or operating system 120 can render a control element in user interface 340 that a user can use to initiate one or more OCR processes, routines, or applications. In related embodiments, such OCR processes, routines, or applications can include a real-time screen capture of graphics or images from graphics processor 320 rendered based on graphical data from operating system 120 and from application 420 through operating system 120. As discussed above, the real-time screen capture can include only the graphics or image that are or will be displayed at any given time on user interface 340. In some embodiments, user interface 340 can include a graphical user interface with a combination of images, graphics, rendered text, controls, and the text labels associated with the controls. Accordingly, the graphics sent from the graphics processor 320 to user interface 340 can include data for rendering all such elements. In such embodiments, the screen capture routine or the optical character recognizer 121 of FIG. 4 or FIG. 5 can initially determine the location of rendered text, labeled controls, and images.

In response to the determination of the location of rendered text, labeled controls, and images, the screen capture routine or the optical character recognizer 121 can determine a number of zones. Each zone can be associated with the determined type of information within that zone, i.e., images, graphics, rendered text, controls, and the rendered text labels. In the zones with images or graphics, the optical character recognizer 121 can perform an initial word detection process or routine to determine where the image or graphic might include embedded text. Such information can be provided to the text selector 335 to use as a placeholder for the visual representation indicating selectable text. In parallel, the optical character recognizer 121 can continue to process and/or recognize the text embedded in images or graphics. In such embodiments, in the time it typically takes for a user to select some portion of the available text displayed in user interface 340, the optical character recognizer 121 can complete or continue to process the images or graphics. Such parallel processing of initial text detection and actual OCR processes improves the user experiences by limiting the delay between the time that a screen capture or text extraction mode is initiated and the time that the text selector 335 can provide text selector tools or other visual indications of selectable text.

One example of a user interface that can include a combination of rendered text, labeled buttons, and images with embedded text, is a web browser. Web browsers displayed in user interface 340 can include an address field with rendered text, labeled control buttons, rendered text content, and rendered image content. Upon the initiation of a screen capture process, the optical character recognizer 121 can perform the initial zone determination. During the initial zone determination, optical character recognizer can detect zones within the captured the screen capture which include various types of images, graphics, rendered text, controls, and associated text labels. As discussed above, for zones which include rendered text, the operating system 120, the optical character recognizer 121 can intercept the text data from the graphical data before it is sent to the graphics processor 320. For example, the address bar may contain a URL of rendered text that can be intercepted before an augmented or truncated version of the rendered text is displayed in text field of the address bar. Typically the text in the address bar is unformatted but includes much more text than can be readily displayed within the limited confines of the navigation bar in the graphical user interface. For such text, the optical character recognizer can extract the entirety of the text in a URL before it is presented as an augmented or truncated form. In this way, when the indication of selectable text is generated in the zone on or around the address field and designated as or associated with rendered text, selection of the selectable text in the address field can select the entirety of the underlying text of the URL and not just the portion of the URL that is currently displayed.

Similarly, for zones with buttons labeled with text, the operating system 120 or the optical character recognizer 121 can intercept the text data for the label from the graphical data before it is sent to the graphics processor 320. For example, a web browser can include various rendered operable control buttons that can be associated with a text label that may or may not be displayed in the user interface 340. Some operable buttons in graphical user interfaces can include a pop-up text label when the cursor, or other selector, hovers above or near the button. For example, a navigation button that can be used to go back one web page can be rendered as an arrow pointing to the left. However when a user hovers a cursor or a finger above the back button in the user interface 340, the text label may be temporarily displayed to identify the name and or function of the button. In the specific example of the web browser, if a user were to hover a cursor or finger above the back button, the word "back" might be temporarily displayed. In such scenarios, the optical character recognizer 121 can intercept the text label associated with rendered operable button. In some embodiments, the optical character recognizer 121 can intercept the text label regardless of whether it is permanently, temporarily or never displayed in the user interface 340. The optical character recognizer 121 can then send such information to the text selector 335 in order to apply a visual indication of selectable text in the zone on or around the operable button.

The rendered text in the content area of a web browser can also be intercepted by operating system 120 or optical character recognizer 121 which can detect, determine, and intercept the text data, before the graphical data, which can include the text data, is sent to the graphics processor 320 and/or the user interface 340. The location, size, and other specifics of the rendered text within the displayed user interface 340 can then be sent to the text selector 335 so it can provide selector tools and or other visual indications of selectable text within user interface 340.

Finally, rendered images or graphics in the content area of a web browser or other application user interface can also include embedded text. However, in such scenarios, since the text has been rendered into an image or graphic, it is not associated with or connected to encoded text data or other data that can be used to render the text. In such scenarios, the optical character recognizer 121 can apply various types of optical character recognition processes or routines to detect and recognize the text embedded within the images. As discussed above, the optical character recognizer 121 can perform an initial word detection routine to provide location placeholders that text selector 335 can use to generate visual indications of selectable text content area of the web browser displayed in user interface 340. With the placeholder visual indications of selectable text in the content area, the optical character recognizer can continue to process or complete processing the image or graphical data into potential text data before user input indicating selected text is received.

Text selector 335 can then receive the selected text and provide the selected text to the application selector 355. The application selector 355, based on various factors and associated context and definitions, can provide an application selection of one or more applications and the selected text to the operating system 120. Operating system 120 can then generate a compilation of one or more locally or remotely available applications and the selected text with instructions for graphics processor 320 to generate a visual representation in the user interface 340 of the selected applications and the selected text.

Figure 6:
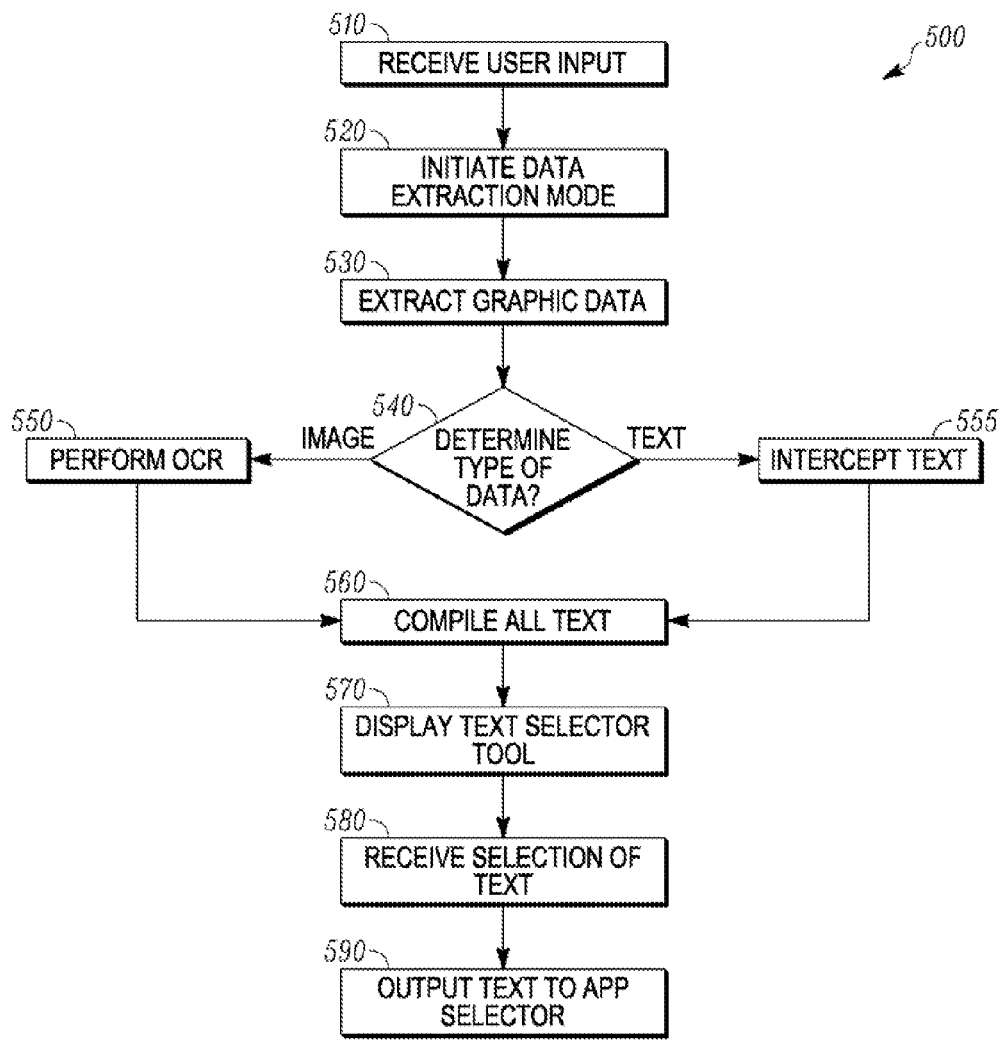
FIG. 6 is a flowchart of a method for text extraction.

FIG. 6 is a flowchart of a method 500 according to various embodiments of the present disclosure. Such methods can be implemented as a combination of software, firmware, and hardware. For example, method 500 can be implemented in electronic device 100. Method 500 can begin at action 510, in which the electronic device receives a user input. Such user input can include operation of a physical button on a physical user interface device or operation of a rendered button or control on a graphical user interface of the electronic device. In response to the user input, the electronic device can initiate a data extraction mode, in action 520. Initiation of the data extraction mode can include initiating one or more applications or starting one or more subroutines in the operating system. For example, initiating the data extraction mode can include executing a data extractor application or subroutine.

In some embodiments, the data extractor can include functionality for capturing the an initial screenshot or screen capture of any and all information or data displayed on a user interface or display of the electronic device at or at a time after the data extraction mode it initiated.

For example, the user interface can include a computer display device, such as a computer monitor or touch screen. The computer display device can display information from various operating system functions, an application running in the foreground, as well as information from one or more other applications or operating system functions running concurrently in the background. All such information can include rendered text, rendered controls, control labels associated with the rendered controls, and images or graphics that may or may not include embedded text. Accordingly, the screen capture can include displayed information from a number of processes and routines running in the foreground and the background.

In action 530, the electronic device can extract the graphical data. In some embodiments, extracting the graphical data can include performing a preliminary segmentation of the data and information displayed in the user interface into a plurality of zones. Since action in action 540, the operating system or text extractor can determine the type of data that is included in each of the zones. If a zone includes image or graphical data, then optical character recognition processor routine can be performed in action 550. If the zone includes rendered text, then the text data associated with the rendered text can be intercepted directly from the operating system or the application generating the rendered text in action 555. Based on the determined type of data within each zone, any available text can be determined using the optical character recognition process of action 550 or the text interception process of action 555. Once all the text data is determined in actions 550 or 555, the resulting text data can be compiled in action 560. Compiling the resulting text data can include collecting the size and location on the user interface or display device associated with rendered text of the determined text data.

In response to the compilation of the resulting text data, a visual indication or text selection tool can be generated and displayed in the user interface to indicate which zones are available as selectable text in action 570. In some embodiments, the visual indication or text selection tool can include altering the appearance of the rendered text according to the size and location of the rendered text in the user interface. In action 580, the electronic device can receive a selection of text through the user interface and the text selection tool. The selected text can then be output to an application selector in action 590.

Figure 7:
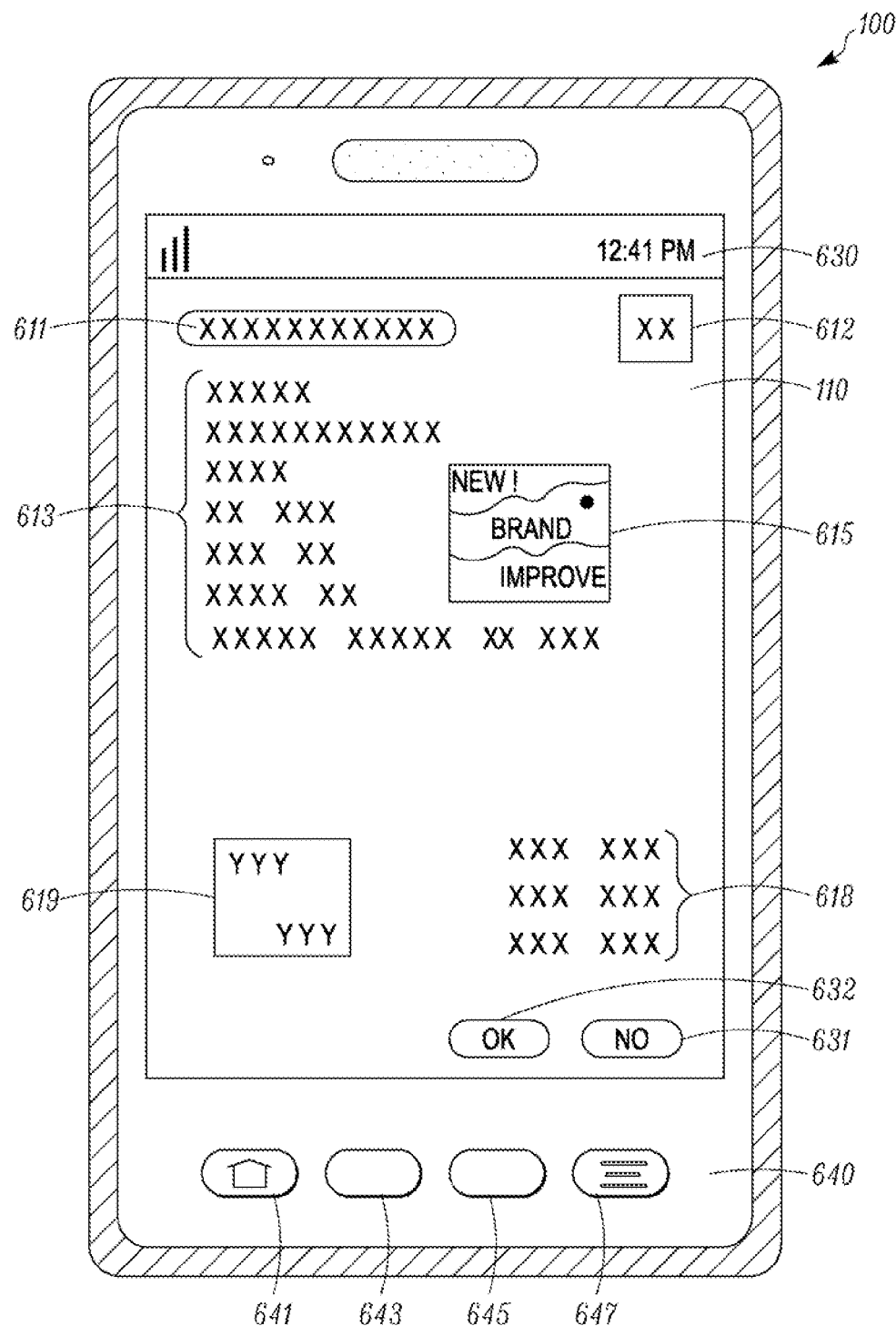
FIG. 7 illustrates a graphical user interface displaying text based and graphics-based text information.

FIG. 7 illustrates an electronic device 100, such as a smart phone or tablet computer, according to various embodiments of the present disclosure. As shown, electronic device 100 can include a number of controls and features such as a general-purpose user interface or display device 110 and various physical and/or rendered controls 641, 643, 645, and 647. User interface or display device 110 is capable of displaying rendered controls that are stylus or finger operable.

In the embodiments shown in FIG. 7, user interface or display device 110 is depicted as displaying a graphical user interface that includes a base level or system-level display area 630 a web browser application. Reference to the web browser application is merely exemplary and is not intended to limit the scope of particular embodiments. Other types applications and their associated user interfaces can also be used.

The base level or system-level display area 630 can include information from the operating system including operating system level information such as time, network signal strength, and battery level, etc. The web browser graphical user interface, when displaying a website defined by computer executable code stored at the address defined in URL address field 611, can include an augmented or truncated version of URL in address field 611, rendered text content 613 and 618, an image with embedded text 615, a placeholder window with a link to one or more other static or dynamic data sources 619, rendered controls with text labels 612, 631, and 632. In some embodiments, the user interface can include a text extraction mode control 647.

When the text extraction mode control 647 is operated, electronic device 100 can initiate a text extraction mode according to various embodiments of the present disclosure. In one embodiment, activation of the text extraction control 647 causes the electronic device 100 to execute one or more text extraction applications or subroutines. Such applications and subroutines can be executed at the operating system level or by standalone applications external to the operating system. In some embodiments, a first text extraction application or routine can include identifying various zones of text within the displayed graphical user interface. In other embodiments, the operating system in the electronic device 100 can identify the various zones of the text within the displayed graphical user interface. In either such embodiments, the graphical user interface may or may not show visual indications of the identified zones.

Each of the identified zones can be associated with a text type. For example, the zones associated with the rendered text in address field 611, rendered text in labeled button 612, and the rendered text 613 or 618 can be identified as zones of text that can be intercepted from the graphical data or text data in the rendering tree before such data is sent to the graphics engine. In contrast, zones associated with graphics or images 615 and 619 can be identified as having text that will need to be extracted using an optical character recognition program or subroutine.

Figure 8:
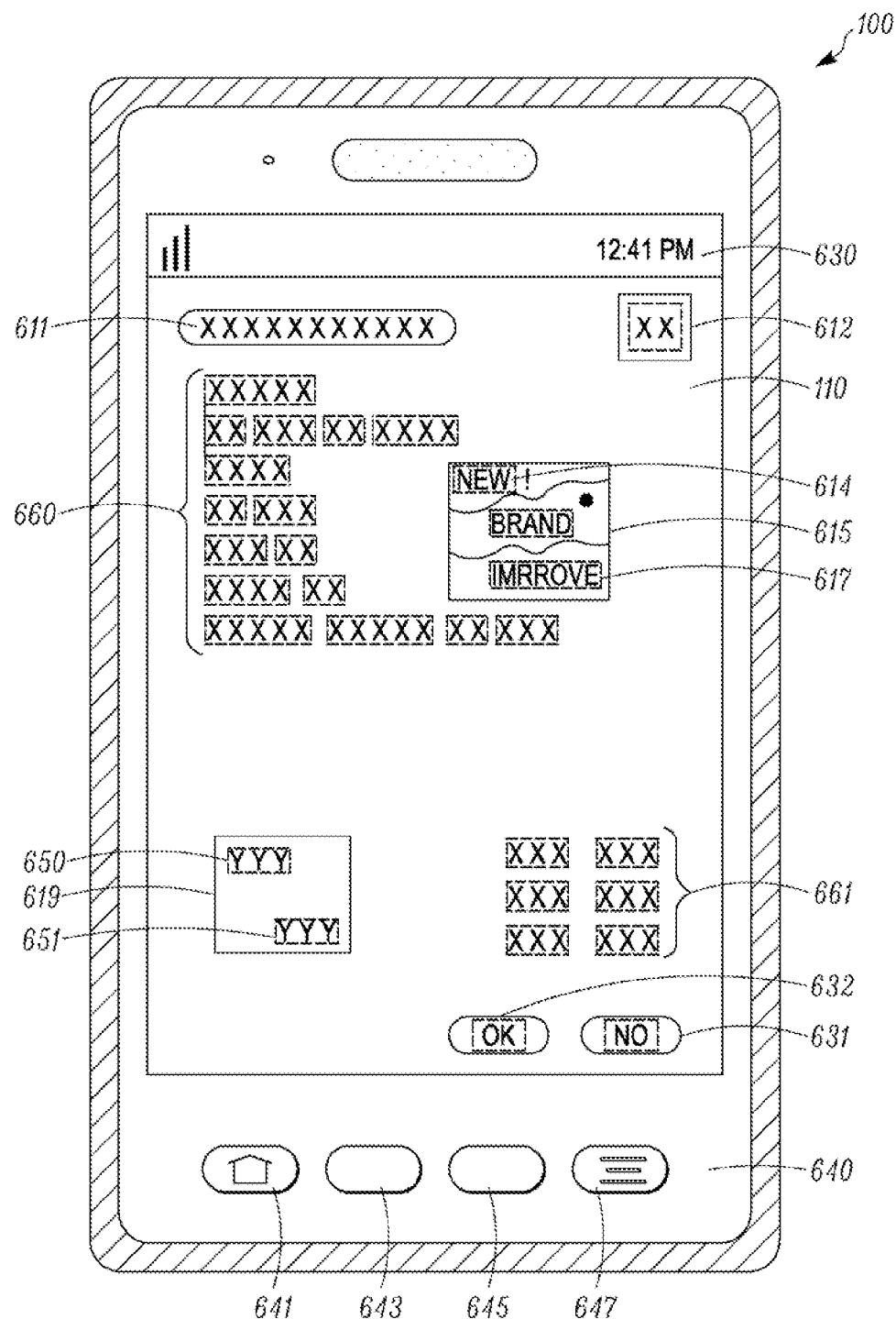
FIG. 8 illustrates a graphical user interface displaying text based and graphics-based text information with identified text.

FIG. 8 illustrates one embodiment of a text selector tool applied to the user interface 610 with visual indications of selectable text during or after the various zones of identified text are recognized or extracted. In the specific example shown in FIG. 8, the text in sections 660 and 661 have been outlined or highlighted according to detected groups of letters or characters forming words or phrases. Similarly, the rendered text label associated with rendered controls 612, 631, and 632 have been outlined or highlighted. Text detected during one or more OCR processes or routines in images 615 and 619 have also been highlighted or outlined. For example text 650 and 651 have been highlighted in image 619. Similarly, text 614, 616, and 617 have also been highlighted or outlined in image 615. With all or some of the identified text displayed in user interface 610 presented with visual indications of selectable text, the electronic device 100 can wait for selection of selected text.

Figure 9:
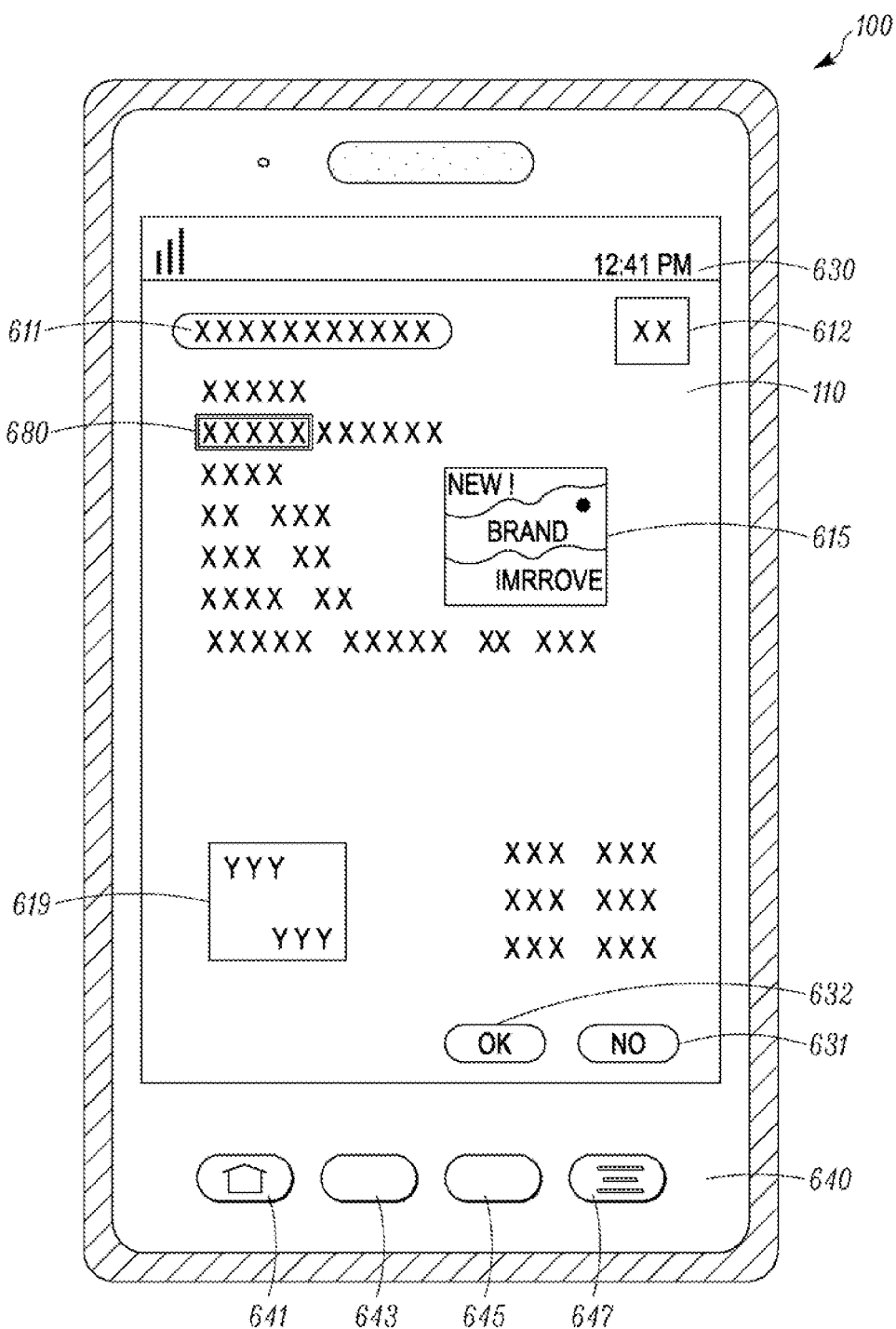
FIG. 9 illustrates a graphical user interface displaying text based and graphics-based text information with a text selection tool.

For example, as shown in FIG. 9, selected text 680 is shown as being selected in an double walled box. In some embodiments, the electronic device 100 can wait a predetermined amount of time after selected text 680 is selected, after which the selected text 680 can be sent to the application selector for application selection based on meanings, definitions, or contexts associated with the selected text 680. In other embodiments, electronic device 100 only sends the selected text 682 to the application selector after the user operates one or more physical or rendered controls to indicate completion of the text selection process. A user may operate text extraction mode control 647 to indicate to electronic device 100 that he or she has completed selecting text into initiate sending the selected text to the application selector.

Figure 10:
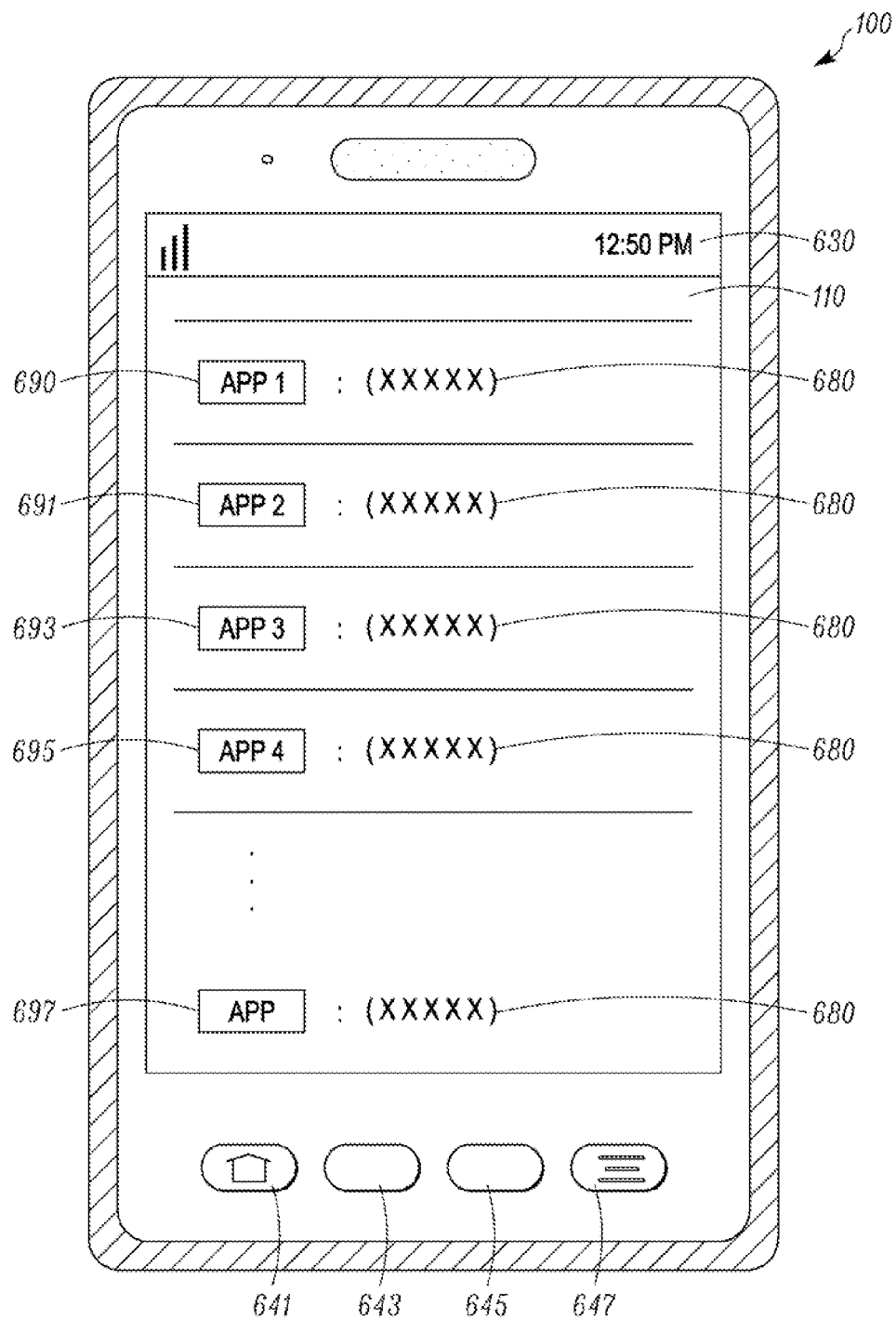
FIG. 10 illustrates a graphical user interface displaying selected text applied to multiple applications.

FIG. 10 illustrates one specific embodiments of the visual representation of the output of an application selector based on selected text 680 being selected in the text selection tool of FIG. 8. As shown, Z, where Z is a natural number, applications 690, 691, 693, 695, and 697 have been selected based on various criteria and user preferences in response to the selected text 680. In the particular example shown in FIG. 10, each indication of an application paired with the selected text 680 can be selected to execute or launch the respective application with selected text 680 being pasted into our input into an appropriate field.

Figure 11:
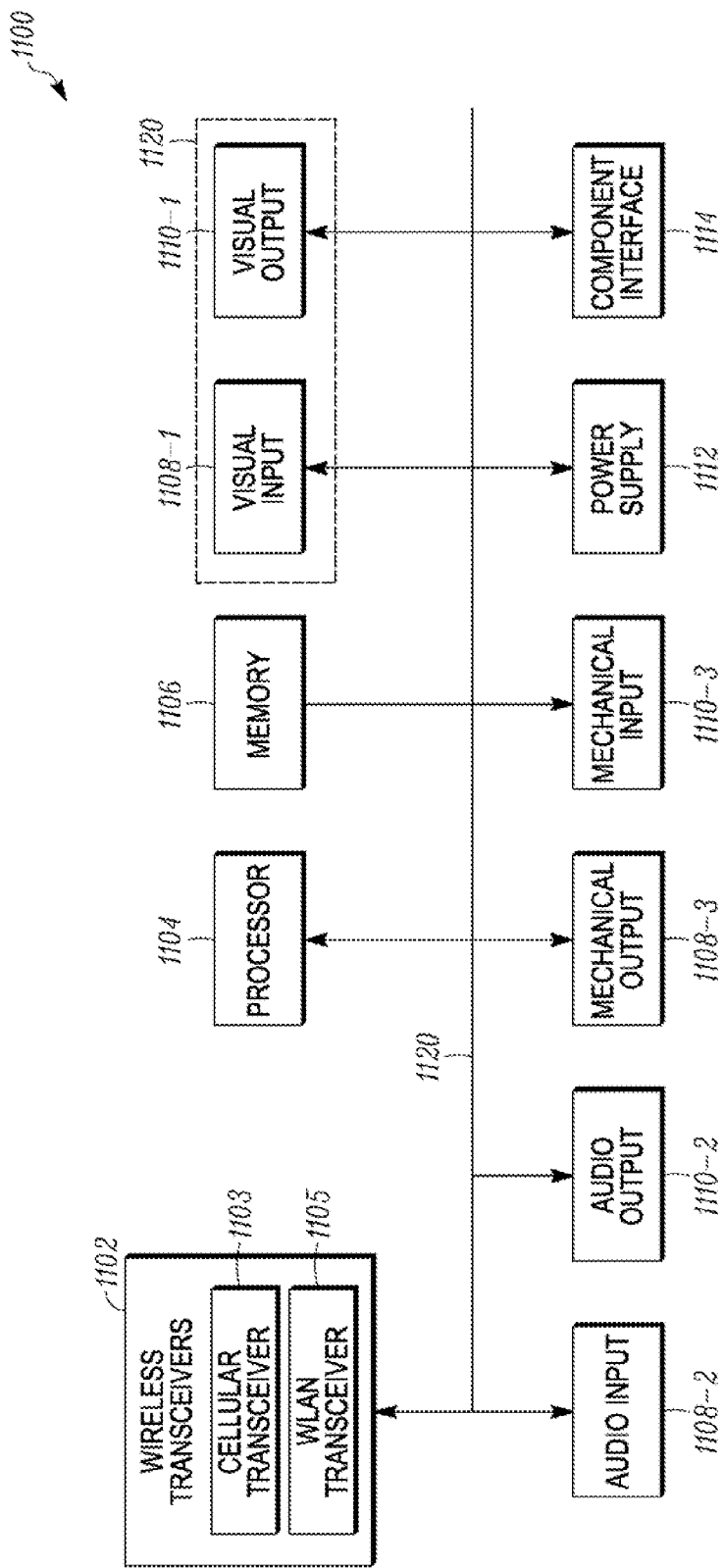
FIG. 11 shows a block diagram that illustrates internal components of a mobile device implementation.

Electronic device 100 can also include features and components for mobile computing and mobile communication. For example, FIG. 11 shows a block diagram that illustrates internal components 1100 of a mobile device implementation of the electronic device 100, according to present disclosure. Such embodiments can include wireless transceivers 1102, a processor 1104 (e.g., a microprocessor, microcomputer, application-specific integrated circuit, etc.), a memory portion 1106, one or more output devices 1108, and one or more input devices 1110. In at least some embodiments, a user interface, is present that includes one or more output devices 1108-1 and one or more input devices 1110-1. Such embodiments can include a graphical user interface that is displayed on a touch sensitive device, (e.g. a capacitive, resistive, or inductive touch screen device).

The internal components 1100 can further include a component interface 1114 to provide a direct connection to auxiliary components or accessories for additional or enhanced functionality. For example, component interface can include a headphone jack or a peripheral data port. The internal components 1100 can also include a portable power supply 1112, such as a battery, for providing power to the other internal components. All of the internal components 1100 can be coupled to one another, and in communication with one another, by way of one or more internal communication links 1120 (e.g., an internal bus).

Each of the wireless transceivers 1102 utilizes a wireless technology for communication, such as, but not limited to, cellular-based communication technologies such as analog communications, using advanced mobile phone system (AMPS), digital communications using code division multiple access (CDMA), time division multiple access (TDMA), global system for mobile communication (GSM), integrated digital enhanced network (iDEN), general packet radio service (GPRS), enhanced data rates for GSM evolution (EDGE), etc., and fourth generation communications using universal mobile telecommunications system (UMTS), code wide division multiple access (WCDMA), long term evolution (LTE), IEEE 802.16, etc., or variants thereof, or peer-to-peer or ad hoc communication technologies such as HomeRF, Bluetooth and IEEE 802.11 (a, b, g or n), or other wireless communication technologies such as infrared technology. In the present embodiment, the wireless transceivers 1102 include both cellular transceivers 1103 and a wireless local area network (WLAN) transceiver 1105, although in other embodiments only one of these types of wireless transceivers (and possibly neither of these types of wireless transceivers, and/or other types of wireless transceivers) is present. Also, the number of wireless transceivers can vary from zero to any positive number and, in some embodiments, only one wireless transceiver is present and further, depending upon the embodiment, each wireless transceiver 1102 can include both a receiver and a transmitter, or only one or the other of those devices.

According to various embodiments, the wireless transceivers 1102 can operate in conjunction with others of the internal components 1100 of the electronic device 100 and can operate in various modes. For example, one mode includes operation in which, upon reception of wireless signals, the internal components detect communication signals and the transceiver 1102 demodulates the communication signals to recover incoming information, such as voice and/or data, transmitted by the wireless signals. After receiving the incoming information from the transceiver 1102, the processor 1104 formats the incoming information for the one or more output devices 1108. Likewise, for transmission of wireless signals, the processor 1104 formats outgoing information, which may or may not be activated by the input devices 1110, and conveys the outgoing information to one or more of the wireless transceivers 1102 for modulation to communication signals. The wireless transceiver(s) 1102 convey the modulated signals to a remote device, such as a cell tower or a remote server (not shown).

In related embodiments, the input and output devices 1108, 1110 of the internal components 100 can include a variety of visual, audio, and/or mechanical outputs. For example, the output device(s) 1110 can include a visual output device 1110-1, such as a liquid crystal display and light emitting diode (LED) indicator, an audio output device 1110-2, such as a speaker, alarm, and/or buzzer, and/or a mechanical output device 1110-3, such as a vibrating mechanism. The visual output devices 1110-1 among other things can include the display device 110 of FIGS. 1 and 2.

The input devices 1108 can include a visual input device 1108-1, such as an optical sensor (for example, a camera), an audio input device 1108-2, such as a microphone, and a mechanical input device 1108-3, such as a Hall effect sensor, accelerometer, keyboard, keypad, selection button, touch pad, touch screen, capacitive sensor, motion sensor, and/or switch. Actions that can actuate one or more input devices 1108 can include, but need not be limited to, opening the electronic device, unlocking the device, moving the device, and operating the device.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more electronic devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   intercepting, by an electronic device, graphical data being output, by a first application, to a graphics processor of the electronic device, the first application being an active application;
   segmenting, by the electronic device, the graphical data into a plurality of zones;
   associating, by the electronic device, each of the plurality of zones with one of a plurality of zone type designators, wherein the plurality of zone type designators include at least a text field designator and an image field designator;
   executing, by the electronic device, a text interception routine on a first zone from the plurality of zones to extract a first portion of text data, the first zone being associated with the text field designator;
   executing, by the electronic device, an optical character recognition routine on a second zone from the plurality of zones to extract a second portion of text data, the second zone being associated with the image field designator;
   responsive to extracting the first and second portions of text data:
      changing, by the electronic device, an appearance of the first and second portions of text data to visually indicate at least a portion of the first and second portions of text data as being selectable; and
      displaying the first and second portions of text data and a text selection tool;
   receiving, by the electronic device and via the text selection tool, a user input designating at least a subset of the first and second portions of text data; and
   executing, by the electronic device, one or more second applications, wherein at least the subset of the text data is available for use by the one or more second applications in response to receiving the user input.

2. The method of claim 1, wherein executing one or more second applications comprises sending at least the subset of the first and second portions of text data to a remote server computer for use in executing the one or more second applications.

3. A non-transitory computer-readable storage medium encoded with instructions that, when executed, cause one or more processors of an electronic device to:
   intercept graphical data being output, by a first application, to a graphics processor of the electronic device, the first application being an active application;
   segment the graphical data into a plurality of zones;
   associate each of the plurality of zones with one of a plurality of zone type designators, wherein the plurality of zone type designators include at least a text field designator and an image field designator;
   execute a text interception routine on a first zone associated with the text field designator to extract a first portion of text data;
   execute an optical character recognition routine on a second zone associated with the image field designator to extract a second portion of text data;
   responsive to extracting the first and second portions of text data:
      change an appearance of the first and second portions of text data to visually indicate at least a portion of the first and second portions of text data as being selectable; and
      display the first and second portions of text data and a text selection tool;
   receive, via the text selection tool, a user input designating at least a subset of the first and second portions of text data; and
   execute one or more second applications, wherein at least the subset of the first and second portions of text data is available for use by the one or more second applications in response to receiving the user input.

4. The non-transitory computer-readable storage medium of claim 3, wherein the instructions cause the one or more processors to send at least the subset of the first and second portions of text data to a remote server computer for use in executing the one or more second applications.

5. An apparatus comprising:
   one or more processors;
   a display device coupled to the one or more processors; and
   a non-transitory computer-readable storage medium encoded with instructions, that when executed, cause the one or more processors to:
      intercept graphical data being output, by a first application, to a graphics processor of the electronic device, the first application being an active application;

segment the graphical data into a plurality of zones;
associate each of the plurality of zones with one of a plurality of zone type designators, wherein the plurality of zone type designators include at least a text field designator and an image field designator;
execute a text interception routine on a first zone associated with the text field designator to extract a first portion of text data;
execute an optical character recognition routine on a second zone associated with the image field designator to extract a second portion of text data;
responsive to extracting the first and second portions of text data:
   change an appearance of the text data to visually indicate at least a portion of the first and second portions of text data as being selectable; and
   display the first and second portions of text data and a text selection tool;
   receive, via the text selection tool, a user input designating at least a subset of the first and second portions of text data; and
   execute one or more second applications, wherein at least the subset of the first and second portions of text data is available for use by the one or more second applications in response to receiving the user input.

6. The apparatus of claim 5, wherein the instructions cause the one or more processors to send at least the subset of the first and second portions of text data to a remote server computer for use in executing the one or more second applications.

* * * * *